United States Patent
Jeong et al.

(10) Patent No.: US 9,698,663 B2
(45) Date of Patent: Jul. 4, 2017

(54) ORIENTATION CONTROL DEVICE FOR MAGNETIC FLUID AND METHOD FOR SAME

(71) Applicant: KOREA RAILROAD RESEARCH INSTITUTE, Uiwang-si, Gyeonggi-do (KR)

(72) Inventors: Woo Tae Jeong, Gwonseon-gu (KR); Duck Shin Park, Uiwang-si (KR); Soon Bark Kwon, Seongnam-si (KR)

(73) Assignee: KOREA RAILROAD RESEARCH INSTITUTE, Uiwang-si Gyeonggi-do (KR)

( * ) Notice: Subject to any disclaimer, the term of this patent is extended or adjusted under 35 U.S.C. 154(b) by 389 days.

(21) Appl. No.: 14/426,719

(22) PCT Filed: Apr. 13, 2013

(86) PCT No.: PCT/KR2013/003115
§ 371 (c)(1),
(2) Date: Mar. 6, 2015

(87) PCT Pub. No.: WO2013/165105
PCT Pub. Date: Nov. 7, 2013

(65) Prior Publication Data
US 2015/0303786 A1 Oct. 22, 2015

(30) Foreign Application Priority Data
May 4, 2012 (KR) ........................ 10-2012-0047768

(51) Int. Cl.
*H02K 44/00* (2006.01)
*F01D 1/00* (2006.01)
*H02K 7/18* (2006.01)

(52) U.S. Cl.
CPC ............... *H02K 44/00* (2013.01); *F01D 1/00* (2013.01); *H02K 7/18* (2013.01)

(58) Field of Classification Search
CPC ........ H02K 44/00; H02K 44/08; H02K 44/14; H02K 7/18; H02N 11/00; F01D 1/00; H01L 23/47; H01L 23/473; H01L 23/34
(Continued)

(56) References Cited

U.S. PATENT DOCUMENTS

| 4,064,409 | A | | 12/1977 | Redman | |
|---|---|---|---|---|---|
| 4,468,568 | A | * | 8/1984 | Carr, Jr. | .................... F03G 7/05 219/121.3 |

(Continued)

FOREIGN PATENT DOCUMENTS

| JP | 2002-034233 A | 1/2002 |
|---|---|---|
| JP | 2002-050727 A | 2/2002 |

(Continued)

*Primary Examiner* — Tran Nguyen
(74) *Attorney, Agent, or Firm* — Novick, Kim & Lee, PLLC; Jae Youn Kim

(57) ABSTRACT

Provided is an orientation control device for a magnetic fluid, includes: a magnetic fluid having magnetic nanoparticles; an induction power generation unit configured to include a silicone tube through which the magnetic fluid passes and a solenoid coil which is wound around a predetermined section outside the silicone tube to generate induced power when the magnetic fluid passes through an inner side of the silicone tube; and a magnetic pole direction control unit configured to include a silicone tube at an entrance portion of the induction power generation unit and a solenoid coil wound around a predetermined section outside the silicone tube and generating a flux when a current flows therein so as to control pole orientation of the magnetic fluid.

5 Claims, 4 Drawing Sheets

(58) Field of Classification Search
USPC ........... 310/10, 11, 306; 62/259.2; 165/80.4,
165/104.26; 290/1 A; 335/47;
257/E23.098
See application file for complete search history.

(56) References Cited

U.S. PATENT DOCUMENTS

| | | | |
|---|---|---|---|
| 6,628,017 B1* | 9/2003 | Chass | H02K 35/06 |
| | | | 310/11 |
| 7,445,101 B2 | 11/2008 | Ribaldone et al. | |
| 7,973,434 B2* | 7/2011 | Yazawa | F04B 19/006 |
| | | | 257/713 |
| 2002/0153781 A1* | 10/2002 | Chass | B60C 23/041 |
| | | | 310/11 |
| 2004/0182099 A1* | 9/2004 | Hsu | H01L 23/473 |
| | | | 62/259.2 |

FOREIGN PATENT DOCUMENTS

| | | |
|---|---|---|
| JP | 2004-274942 A | 9/2004 |
| JP | 3129644 U | 3/2007 |

\* cited by examiner

ORIENTATION CONTROL DEVICE FOR MAGNETIC FLUID AND METHOD FOR SAME

TECHNICAL FIELD

The present invention relates to a device for converting medium-low temperature heat energy (in particular, waste heat) into electricity, and more particularly, to an orientation control device for a magnetic fluid and a method for the same capable of efficiently generating an electromotive force in an induction coil by controlling orientation of magnetic particles forming a magnetic fluid, thereby generating electricity.

BACKGROUND ART

At present, as fossil fuel such as coal, petroleum, and natural gas which are being used as important energy sources is depleted, various research and developments for increasing use efficiency of energy, in particular, efficiently converting medium-low temperature heat energy (in particular, waste heat) into electric energy have been conducted.

As illustrated in FIG. 1, a thermodynamics Rankine cycle which is used to convert heat energy into electric energy has a structure in which a working fluid circulated by a pump 10 is converted into high pressure steam by passing through a boiler 20 to rotate a turbine 30 and shaft power generated by the rotation of the turbine 30 rotates a generator 40 connected to the turbine to generate electricity.

As such, in the case of using the high temperature heat source, as the working fluid, water has been mainly used and in the case of using the medium-low temperature heat source, as the working fluid which is configured of an organic Rankine cycle and thus has a low boiling point and a high vapor pressure, a Freon-based refrigerant and a hydrocarbon-based organic mixture such as propane have been used.

However, in the case of the existing thermoelectric conversion cycle, the turbine and the generator in addition to a heat exchanger are additionally mounted, and thus thermoelectric conversion efficiency is low and a size of a system is large, such that it is difficult to recover heat from various kinds of devices generating waste heat, and in particular, in the case of the medium-low temperature waste heat, it is difficult to recover heat and perform conversion into electricity.

As a method for solving the above problem, U.S. Pat. No. 7,445,101 discloses a system for circulating a magnetic fluid having magnetic particles instead of the existing working fluid (refrigerant) in a closed loop and directly performing conversion into electricity using an induction coil, in which the system is a device for spinning (rotating) magnetic particles inside a circulator which circulates the cycle by a permanent magnet to generate a current induced into an induction coil and has a difficulty in efficiently generating a flux required to draw an induction current due to a disorder occurring at the time of circulating the magnetic particles and an offset of the flux occurring by the spinning.

As illustrated in FIGS. 2 and 3, a device for generating electricity using magnetic particles according to an embodiment disclosed in U.S. Pat. No. 4,064,409 is configured to include a magnetic fluid 100 having magnetism in a nano size unit, a tube 110 which is a passage through which the magnetic fluid flows, a pump 130 which circulates the magnetic fluid 100 through the tube 110, and an induction power generation unit 200 which obtains electricity by a flow of the magnetic fluid 100.

In this case, in particular, as illustrated in FIG. 3, the induction power generation unit 200 is configured to include a silicone tube 220 through which the magnetic fluid 100 passes by the pump 130 and a solenoid coil 230 spirally wound around a predetermined section outside the silicone tube 200 to enclose the silicone tube 220 to obtain an electromotive force from induction power generated based on a Fleming's right hand rule due to the flow of the magnetic fluid 100.

The magnetic fluid 100 is a fluid in which magnetic powders having nanoparticles are stably dispersed in a liquid in a colloidal shape and a surfactant to prevent precipitation or aggregation from occurring is added. Generally, when lines of magnetic force pass through a plane which is vertical to a magnetic field and has an area A, the number of lines of magnetic force passing through a unit area is proportional to a size B of the magnetic field. Therefore, the number of lines of magnetic force passing through a surface having the area A is proportional to B*A. When an angle formed by a normal line of the plane and the magnetic field is θ, a flux is B*A*cos θ. That is, when the magnetic field and the plane are vertical to each other, the flux has the largest value as B*A and when the magnetic field and a surface area are parallel with each other, the flux has the smallest value as 0. Therefore, to effectively obtain the electromotive force induced by the flow of the magnetic fluid 100, there is a need to maximize the flux by controlling orientation of polarities of the magnetic fluid 100 which is located at an entrance portion 210 of the induction power generation unit 200, that is, letting magnetic pole directions agree with each other.

Further, ferrofluids may solve the problem in that magnetic property is lost due to a disorder of orientation of one-electrons inducing magnetism when a solid material having magnetism is melted and thus a liquid-phase magnet may not be obtained, and thus research and development into the ferrofluids for applying for other industrial facilities, household appliances, degradation of mobile phones, electric vehicles, and the like has been actively conducted.

DISCLOSURE

Technical Problem

An embodiment of the present invention is directed to an orientation control device for a magnetic fluid and a method for same capable of maximizing conversion efficiency into electricity of magnetic particles passing through a solenoid coil by controlling orientation of polarities of the magnetic fluid in a cycle in which the magnetic fluid having magnetic particles is circulated.

Technical Solution

In one general aspect, an orientation control device for a magnetic fluid, includes: a magnetic fluid having magnetism; an induction power generation unit configured to include a silicone tube through which the magnetic fluid passes and a solenoid coil which is wound around a predetermined section outside the silicone tube to generate induced power when the magnetic fluid passes through an inner side of the silicone tube; and a magnetic pole direction control unit configured to include the silicone tube at an entrance portion of the induction power generation unit and a solenoid coil wound around a predetermined section outside the silicone tube to generate a flux when a current flows therein so as to control pole orientation of the magnetic fluid.

The orientation control device for a magnetic fluid may further include: a permanent magnet formed in a cylindrical shape at the outer side to enclose the solenoid coil so as to control pole orientation of the magnetic fluid passing through the solenoid coil.

In another general aspect, the permanent magnet further includes a conical permanent magnet which is getting thicker as the flux is strong toward the entrance portion of the induction power generation unit.

Also, a control method for orientation of a magnetic fluid includes: exchanging, by a heat exchanger using a magnetic fluid having nanoparticles as a heat medium, heat generated from waste heat; circulating the magnetic fluid heat-exchanged by the heat exchanger using a pressure difference generated during the heat exchange process through a tube forming a loop to an inlet of the heat exchanger by being drawn from an outlet of the heat exchanger; arranging polarity directions of the magnetic fluid by installing the solenoid coil or the permanent magnet at a circumference of one side of the tube, and generating induced power at an adjacent portion thereof through the solenoid coil after arranging the polarity directions of the magnetic fluid.

Advantageous Effects

According to the orientation control device for a magnetic fluid and the method for same of the present invention, in the system in which the fluid having magnetism (magnetic fluid) instead of the existing cycle refrigerant is directly circulated in the heat conversion cycle and used for direct conversion into electricity by using the induction coil, the magnetic particles forming the magnetic fluid are applied through polarities or orientation control method so as to maximize the amount of electromotive force generated in the induction coil and generate electricity efficiently.

Further, the method for performing conversion into electricity to recover heat as well as degradation and cooling of the battery used in the electric vehicle, and the like and cooling heat generated from electrical components proposes new alternatives for a problem of increase in costs and reduction in efficiency at the time of using the thermoelectric element which has been already developed and is expected to apply for other industrial facilities, household appliances, degradation of mobile phones, electric vehicles, and the like.

BEST MODE

Figure 1:
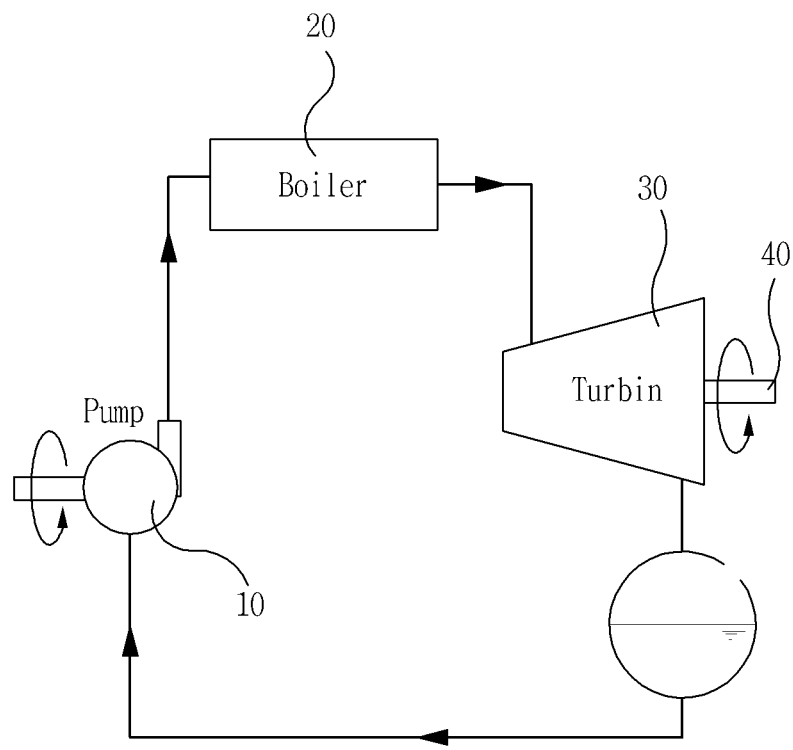
FIG. 1 is a schematic diagram of a dynamics Rankine cycle system according to the related art.
Figure 2:
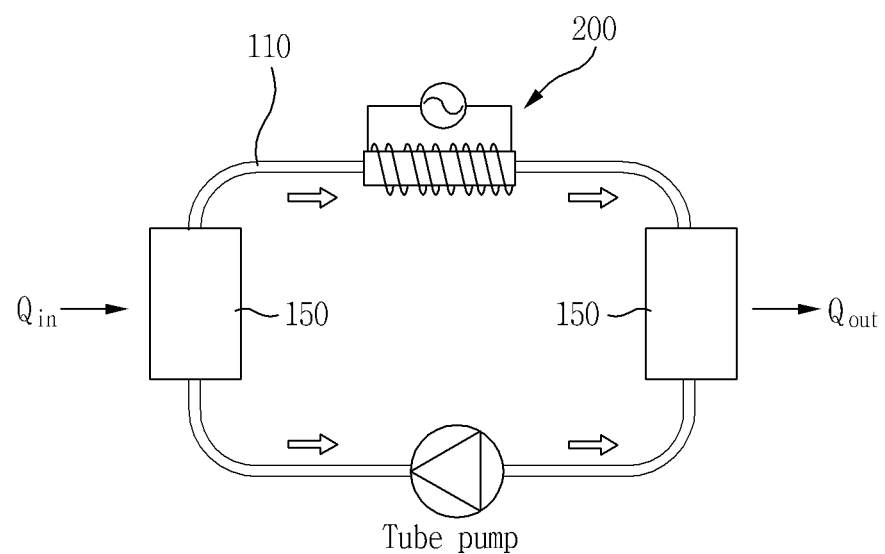
FIG. 2 is a schematic diagram an electricity generation device using a magnetic fluid.
Figure 3:
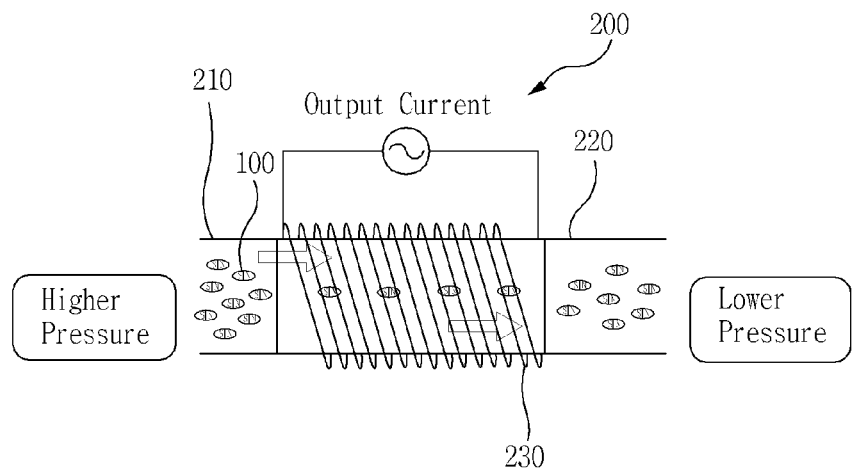
FIG. 3 is a schematic diagram of an induction power generation unit illustrated in FIG. 2.

In order to fully understand the present invention, exemplary embodiments of the invention will be described with reference to the accompanying drawings. The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions may be exaggerated for clarity, and the same reference numerals will be used throughout to designate the same or like components. A detailed explanation of known related functions and constitutions may be omitted to avoid unnecessarily obscuring the subject matter of the present invention.

Figure 4:
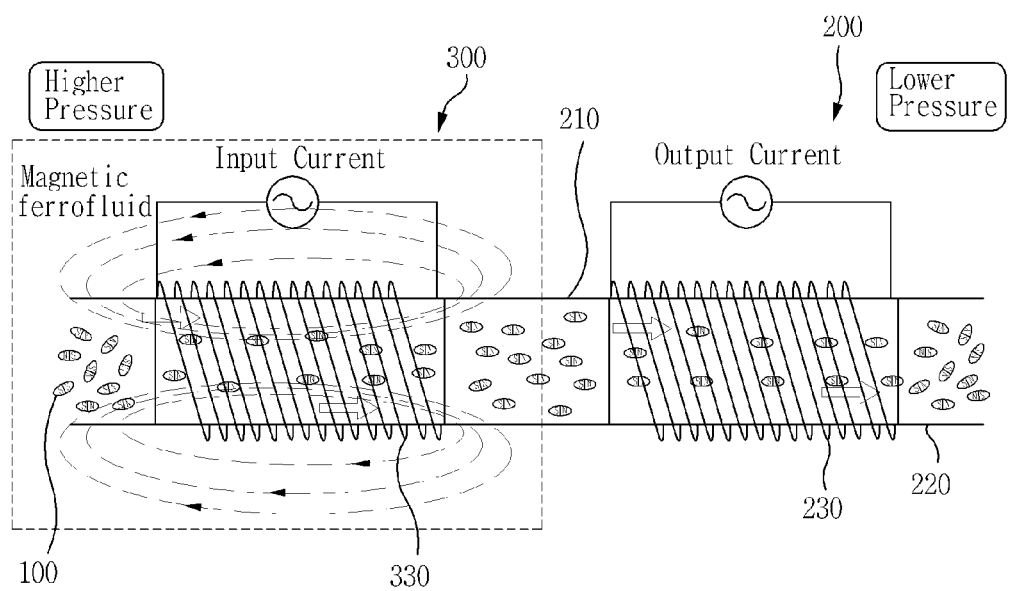
FIG. 4 is a schematic diagram of the induction power generation unit in which a magnetic pole direction control unit according to the present invention is included.

First, as illustrated in FIG. 4, an orientation control device for a magnetic fluid according to the present invention includes a magnetic fluid 100 having magnetic nanoparticles, an induction power generation unit 200 obtaining electricity by a flow of the magnetic fluid 100 in a closed loop silicone tube 220, and a magnetic pole direction control unit 300 which is configured of the silicone tube 220 at an entrance portion 210 of the induction power generation unit 200 and a solenoid coil 330.

In this case, when a flux is generated by making a current flowing in the solenoid coil 330, the magnetic fluid passing through the solenoid coil 330 within the silicone tube 220 is affected by the flux formed by the solenoid coil 330 to control the orientation and thus magnetic poles of each nanoparticles forming the magnetic fluid head for the same direction. That is, each nanoparticle forming the magnetic fluid are arranged in the same direction as an N pole or an S pole to head for an outlet direction of the solenoid coil 330.

As such, the magnetic fluids which are arranged to make the magnetic poles face the same direction in a progress direction pass through the silicone tube 220 around which the solenoid coil 230 is wound via the entrance portion 210 of the induction power generation unit 200.

The solenoid coil 230 is manufactured by spirally winding an electric wire densely, uniformly, and lengthily in a cylindrical shape and a magnetic field having a relatively uniform magnitude is formed in the solenoid coil 230 in the same direction by a Fleming's right hand rule when a current flows in the solenoid coil 230. In this case, the magnitude of internal magnetic field is proportional to a magnitude in current and is proportional to a turn number per a unit length. That is, it may be used as an energy conversion device which may control the orientation of the magnetic fluid 100 by generating an electromagnetic field using electric energy and convert magnetic energy of the magnetic fluid 100 into electric energy.

Therefore, an induction electromotive force is generated in the solenoid coil 230 by the Fleming's right hand rule at the instant that the magnetic fluid passes through the silicone tube 220 around which the solenoid coil 230 is wound and the induction electromotive force may be transferred to a storage battery (not illustrated) and stored therein.

Figure 5:
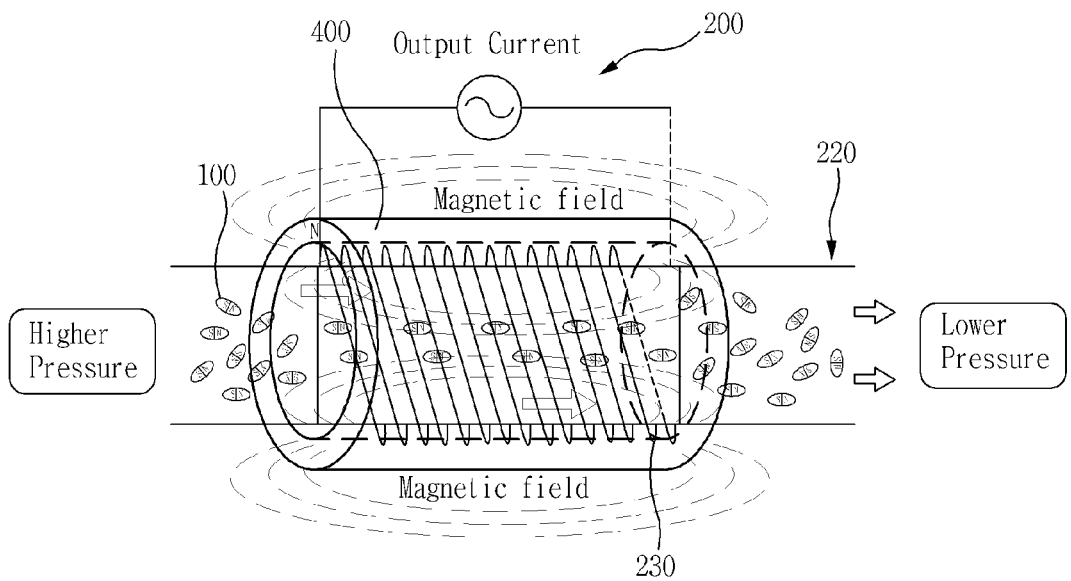
FIG. 5 is a schematic diagram of the induction power generation unit in which a permanent magnet according to the present invention is included.

As another embodiment of the present invention, as illustrated in FIG. 5, a permanent magnet 400 formed in a cylindrical shape is provided around an outer side of the solenoid coil 230 of the induction power generation unit 200 to enclose the solenoid coil 230. In this case, when the magnetic fluid within the silicone tube 220 passes through a section in which the permanent magnet 400 is installed, the magnetic fluid is affected by the flux generated from the permanent magnet 400 and thus as described above, the magnetic fluid passes through a section in which the permanent magnet 400 is installed in the state in which polarity directions agree with each other, thereby maximizing power generation efficiency of the induction power generation unit 200.

Figure 6:
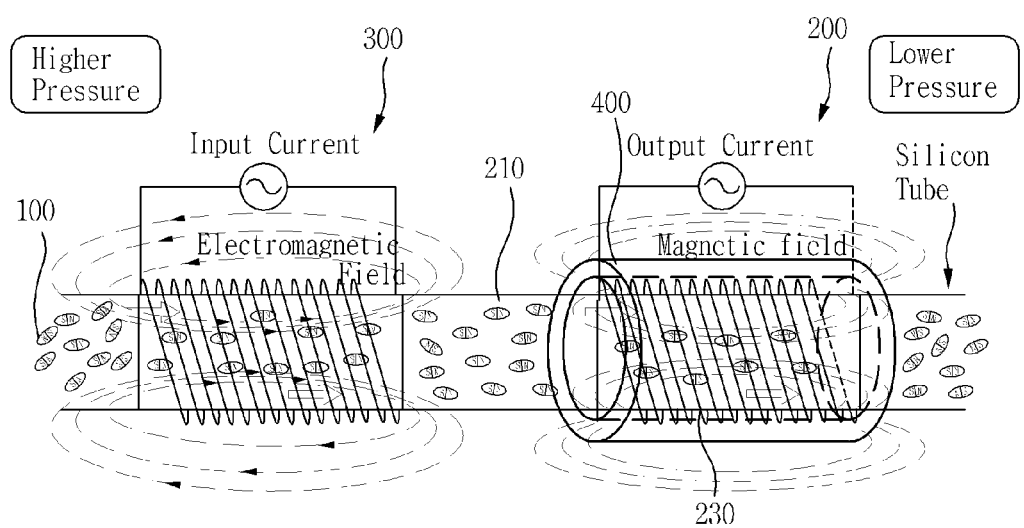
FIG. 6 is a schematic diagram of the induction power generation unit in which the magnetic pole direction control unit and the permanent magnet according to the present invention are included.

According to another embodiment of the present invention, as illustrated in FIG. 6, the magnetic pole direction control unit 300 is provided at the entrance portion 210 of the induction power generation unit 200 and the permanent magnet 400 is provided at the outer side of the solenoid coil 230 of the induction power generation unit 200 to let the magnetic pole direction control unit 300 control the orientation of the magnetic fluid 100 at the entrance portion 210 of the induction power generation unit 200 and the permanent magnet 400 control the orientation of the magnetic fluid 100 passing through the inside of the silicone tube 220 of the induction power generation unit 200, such that the orientation of the magnetic fluid 100 is continuously controlled from before the magnetic fluid enters the silicone tube 220 to passing through the same.

Figure 7:
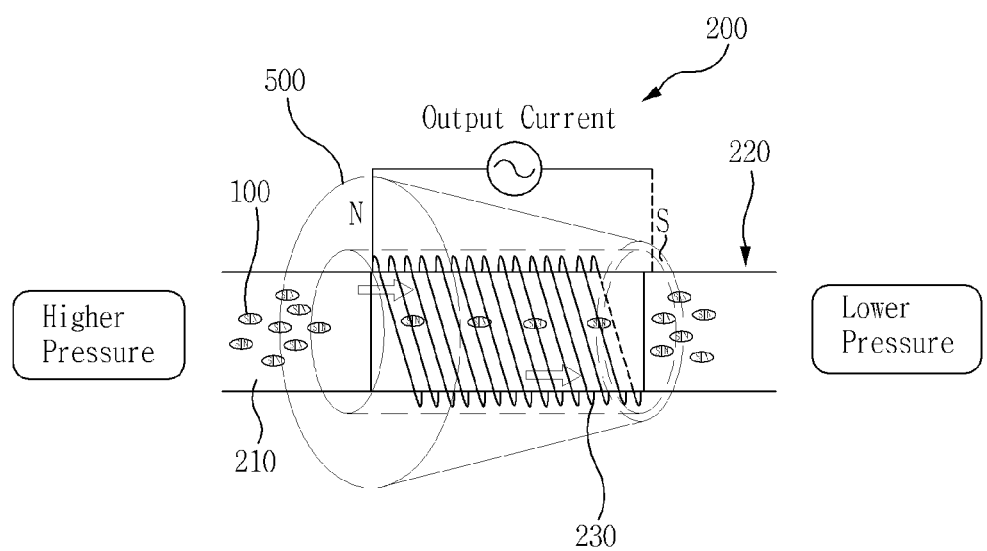
FIG. 7 is a schematic diagram of the induction power generation unit in which a conical permanent magnet according to the present invention is included.

Further, according to another embodiment of the present invention, as illustrated in FIG. 7, a conical permanent magnet 500 which encloses the solenoid coil 230 and is getting thicker as the flux is strong toward the entrance portion 210 of the induction power generation unit 200 is provided around the outer side of the solenoid coil 230. In this case, the orientation of the magnetic fluid 100 which is located at the entrance portion 210 of the induction power generation unit 200 is controlled and the orientation of the magnetic fluid 100 passing through the inside of the silicone tube 220 of the induction power generation unit 200 is continuously controlled.

Meanwhile, according to a control method for orientation of a magnetic fluid, in a first step, the heat exchanger 150 using the magnetic fluid 100 having nanoparticles as a heat medium exchanges heat generated from waste heat.

In a second step, the magnetic fluid 100 heat-exchanged by the heat exchanger 150 is circulated through the tube 110 connected to form a loop from an outlet of the heat exchanger to an inlet of the heat exchanger, by a pressure difference generated during the heat exchange.

In a third step, the solenoid coil 330 or the permanent magnet 400 are provided at a circumference of one side of the tube 110 to arrange the polarity directions of the magnetic fluid.

In a fourth step, the polarity directions of the magnetic fluid are arranged and then the induced power is generated at an adjacent portion thereof through the solenoid coil 230.

The embodiments of the orientation control device for a magnetic fluid and the method for same as described above are only the example. Therefore, it will be appreciated by those skilled in the art that various modifications and equivalent other embodiments are possible from the present invention. Therefore, it may be appreciated that the present invention is not limited to the forms mentioned in the above detailed description. Accordingly, the actual technical protection scope of the present invention must be determined by the spirit of the appended claims. Further, it is to be construed that the present invention includes all the changes, equivalents, and substitutions which are defined in the appending claims.

DETAILED DESCRIPTION OF MAIN ELEMENTS

100: Magnetic fluid 110: Tube
130: Pump 150: Heat exchanger
200: Induction power generation unit 210: Entrance portion
220: Silicone tube 230,330: Solenoid coil
300: Magnetic pole direction control unit 400: Permanent magnet
500: Conical permanent magnet

The invention claimed is:

1. An orientation control device for controlling a magnetic fluid including magnetic nanoparticles, the orientation control device comprising:
   a tube including an upstream portion and a downstream portion, wherein the magnetic fluid including the magnetic nanoparticles enters the upstream portion with high pressure, passes through the upstream portion, enters the downstream portion, passes through the downstream portion, and exits the downstream portion under low pressure;
   an induction power generator including an induction solenoid coil wrapped around the downstream portion of the tube, wherein the induction solenoid coil generates an output current as the magnetic fluid including the oriented magnetic nanoparticles passes through the downstream portion of the tube; and
   a permanent magnet located around and coaxial with the induction solenoid coil,
   wherein the permanent magnet has a hollow truncated conical shape, with an interior cylindrical through-hole and an external truncated conical surface, and
   wherein a thick end of the permanent magnet having the hollow truncated conical shape is located at an upstream end of the induction solenoid coil, and a thin end of the permanent magnet having the hollow truncated conical shape is located at a downstream end of the induction solenoid coil.

2. The orientation control device of claim 1, further comprising:
   a magnetic pole controller including an orientation solenoid coil wrapped around the upstream portion of the tube, wherein the orientation solenoid coil receives an input current and generates an orientation flux to orient the magnetic nanoparticles.

3. An orientation control device for a magnetic fluid, comprising:
   a magnetic fluid having magnetic nanoparticles;
   an induction power generation unit including:
      a silicone tube through which the magnetic fluid passes, and
      a solenoid coil which is wound around a predetermined section outside the silicone tube to generate induced power when the magnetic fluid passes through an inner side of the silicone tube; and
   a permanent magnet at an outer side of the solenoid coil so as to control pole orientation of the magnetic fluid passing through the solenoid coil, and
   wherein the permanent magnet comprises a conical permanent magnet which gets thicker towards an entrance portion of the induction power generation unit.

4. The orientation control device of claim 3, further comprising:
   a magnetic pole direction control unit including:
      an upstream portion of the silicone tube through which the magnetic fluid passes;

an additional solenoid coil wound around the upstream portion of the silicone tube and configured to generate a flux when a current flows through the additional solenoid coil to control a pole orientation of magnetic nanoparticles in the magnetic fluid.

5. A control method for orientation of a magnetic fluid, comprising:
- exchanging, by a heat exchanger using a magnetic fluid having nanoparticles as a heat medium, heat generated from waste heat;
- circulating the magnetic fluid heat-exchanged by the heat exchanger using a pressure difference generated during a heat exchange process through a tube forming a loop to an inlet of the heat exchanger by being drawn from an outlet of the heat exchanger;
- arranging polarity directions of the magnetic fluid by installing a solenoid coil and a permanent magnet at a circumference of one side of the tube; and generating induced power through the solenoid coil after arranging the polarity directions of the magnetic fluid, and
- wherein the permanent magnet comprises a conical permanent magnet that gets thicker towards an entrance portion of the induction power generation unit.

* * * * *